RING COUNTER

Filed May 23, 1966

INVENTOR

Frederick J. Kopetski

BY

Pierre E. Cay

Robert F. Kempf

ATTORNEYS

INVENTOR

Frederick J. Kopetski

BY Robert F. Kempf

ATTORNEYS

United States Patent Office 3,437,832
Patented Apr. 8, 1969

3,437,832
RING COUNTER

Frederick J. Kopetski, Annapolis, Md., assignor to the United States of America as represented by the Administrator of the National Aeronautics and Space Administration Filed May 23, 1966, Ser. No. 552,344
Int. Cl. H03k *23/08*
U.S. Cl. 307—222 7 Claims

ABSTRACT OF THE DISCLOSURE

The invention relates to a semiconductor ring counter circuit for use in counting, dividing, multiplexing and sequencing applications. According to the invention, pulse steering and gating techniques are used so that ring stepping is accomplished directly by the leading edge of the triggering pulse. This versatility enhances monolithic-type ring constructions, and the component design of the ring is compatible with the monolithic construction techniques.

The invention described herein was made by an employee of the United States Government and may be manufactured and used by or for the Government for governmental purposes without the payment of any royalties thereon or therefor.

This invention relates to a semiconductor ring counter circuit for use in counting, dividing, multiplexing, and sequencing applications.

Generally speaking, transistorized ring counter circuits can assume several forms. The basic computer or programer ring counter stage can consist of a flip-flop, silicon controlled rectifier, four layer diode, tunnel diode, or the square loop core. This invention deals specifically with the flip-flop form of ring counter stage. Basically, the conventional flip-flop stage consists of at least two transistors plus a variety of capacitors, diodes, and resistors. A recognized problem of the conventional flip-flop stage is the possibility of two or more stages being in the output state simultaneously.

For these reasons, it is desirable to provide a simplified ring counter with one transistor per stage and also to include means to prevent more than one stage being "on" (i.e., in the output state) at the same time. These features are used in the counter disclosed in U.S. Patent 3,079,513 to Yokelson. But the indirect triggering technique of Yokelson labors under a critical relationship between the *length* of the triggering pulse and the *length* of time that the interstage capacitive triggering network supplies turn-on current (capacitive memory effect). This relationship exists because of the fact that the input trigger does not step the ring circuit directly, but instead it turns off the on stage which in turn charges the interstage capacitor thus producing the trigger necessary to step the ring. Therefore, once the interstage time constant has been fixed the triggering pulse width must be maintained within tight limits.

The direct triggering method of the present invention avoids the above problem. Ring stepping is accomplished directly by the leading edge of the triggering pulse with no capacitor memory effects required for proper operation. Therefore the triggering pulse width used is of practically no consequence. This feature allows a given ring design to be compatible with a great many triggering sources for excellent trigger versatility. Regarding monolithic techniques, the departure from critical circuit time constants is most welcomed because of the difficulties experienced in producing deposited capacitors with close tolerances and stable temperature characteristics. The use of large-valued monolithic capacitors to cover up these deficiencies is undesirable from the production-yield standpoint as well as from the possible frequency-limitation standpoint.

It is an object of this invention to provide a ring counter circuit which has only one transistor per stage and has a design which inherently prevents more than one stage from being in the output state simultaneously.

It is still a further object of this invention to provide a ring counter circuit with an output excursion ranging from the emitter reference level to B+ or B−, thereby enhancing the use of diode-transistor logic.

It is still a further object of this invention to provide an improved triggering and steering circuit for a ring counter of the type described.

It is still a further object of the present invention to provide a diode-transistor logic ring counter which is capable of bi-directional operation and which includes a forward and reverse steering and triggering network, the direction of which is determined by a switch or by the status of a storage-type flip-flop circuit.

It is still a further object of the present invention to provide a ring circuit compatible with monolithic construction techniques by virtue of its unique monolithic-oriented nature.

Other and further objects of the present invention will become apparent with the following detailed description when taken in view of the appended drawings in which.

Basically, the ring counter circuit consists of several stages of a modified diode-transistor NAND gate connected together in such a manner as to permit sequential switching of each gate from a common trigger source. Interconnections between each stage are made through the gating diodes. The output of each stage is also resistively coupled to the triggering networks thus performing the steering function. Outputs from the transistor collectors can be made by using disconnect diodes or by using opposite conductivity type transistors in a collector take-off configuration. The number of input diodes required on any stage can be quickly determined as $\eta=N-1$, where $\eta$ equals the number of diodes and N equals the number of ring counter stages. As a practical matter, the maximum number of stages is limited by transistor parameters, ring-loading and complexity.

Figures 1, 3:
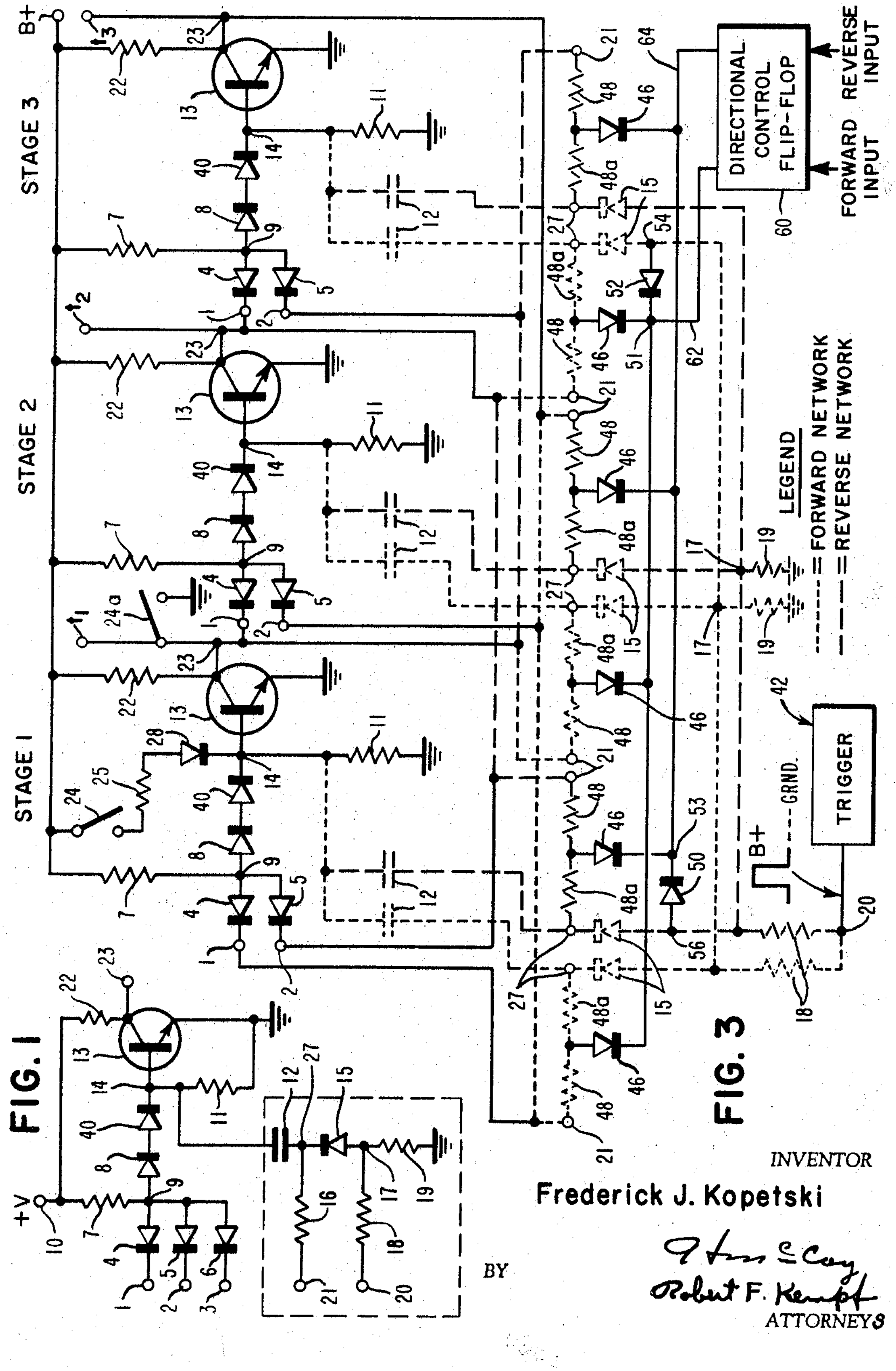
FIGURE 1 is a schematic illustration of the basic component or stage of the ring counter.
FIGURE 3 illustrates the ring counter of the present invention with forward and reverse steering capabilities.

Referring to FIGURE 1, the schematic of one stage of a four stage NPN conductivity type solicon ring counter circuit is illustrated. Terminals 1, 2 and 3 are the gating terminals. Terminal 1 connects to the cathode of diode 4, terminal 2 to the cathode of diode 5, and the terminal 3 to the cathode of diode 6. The anodes of diodes 4, 5, 6 and 8 are connected to resistor 7 at junction 9. The other end of resistor 7 ties to terminal 10, the positive voltage source. To further compensate for variations in transistor collector saturation levels, base emitter thresholds, and diode thresholds, diode 40 is placed in series with diode 8 between the cathode of diode 8 and junction 14 and in the same direction as diode 8. Diodes 8 and 40 serve to increase the turn-on threshold of transistor 13 as seen from junction 9. The cathode of diode 40 is connected to resistor 11, capacitor 12, and the base terminal of transistor 13 at junction 14. The other end of resistor 11 is connected to ground. The other end of capacitor 12 is connected to the cathode of trigger diode 15 and one side of resistor 16. The other end of resistor 16 is connected to the steering input terminal 21. The anode of trigger diode 15 is connected to one side of resistors 18 and 19 at junction 17.

The other side of resistor 18 is connected to the trigger input terminal 20. The other side of resistor 19 is connected to ground. The collector lead of transistor 13 is connected to resistor 22 and the output terminal 23. The other end of resistor 22 is connected to terminal 10.

With no inputs to terminals 1, 2 and 3, but with positive voltage at terminal 10, a current flows through resistor 7, diodes 8 and 40 and resistor 11. When the potential at junction 14, the base of transistor 13, reaches the transistor threshold level, as in the case of a silicon transistor, approximately .5 volt, base current flows and transistor 13 switches to its conducting state, with its collector potential dropping from the nonconducting level equivalent to the voltage at terminal 10 to its conducting level of approximately .1 volt. If then either one of terminals 1, 2 or 3 are clamped to a voltage equivalent to the collector saturation voltage of transistor 13 the current through resistor 7 will be diverted through either diode 4, 5 or 6 and to terminal 1, 2 or 3 where the clamp source is connected. The result is that junction 9 will be clamped to the sum of the forward conduction drop of diode 4, 5 or 6 and the clamp source of .1 volt for a clamp sum of approximately .6 volt. Since the threshold of diodes 8 and 40 combined is approximately 1.0 volt, a current can no longer flow through diodes 8 and 40 and resistor 11 to ground with the result that junction 14 at the base of transistor 13 will assume a potential of approximately 0 volt. This is below the .5 volt threshold level of transistor 13 thereby resulting in the cessation of base current to transistor 13 and the switching of transistor 13 to its nonconducting state. The result is a rise in the collector level of transistor 13, at terminal 23, to the voltage present at terminal 10.

Figure 2:
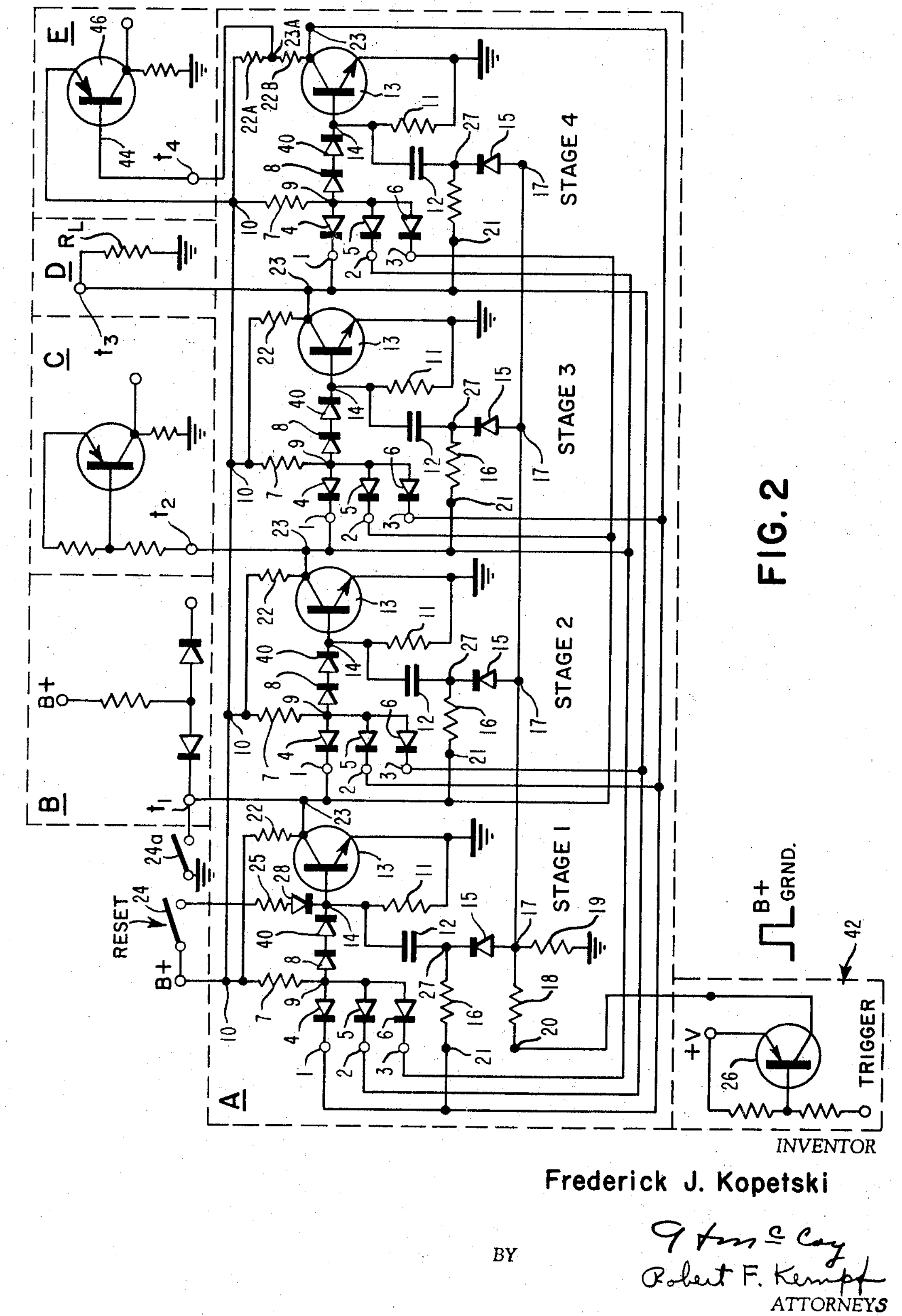
FIGURE 2 is a schematic illustration of the ring counter comprising the present invention.

If steering terminal 21 is now connected to ground potential and a positive going pulse or wave front with an amplitude equivalent to the voltage at terminal 10 and referenced to ground is injected at trigger input terminal 20 through the resistor 18, resistor 19 divider network, transistor 13 switches to its conducting state for a period of time determined by circuit time constants. If on the other hand steering terminal 21 is connected to the voltage supply at terminal 10 capacitor 12 will charge to the level of terminal 10 thus reverse biasing diode 15 and thereby preventing a positive trigger pulse as described previously from providing a current pulse to transistor 13. In this case transistor 13 remains in a nonconducting state. When the steering terminal 21 is reconnected to ground potential capacitor 12 discharges back to ground potential thus removing the reverse bias potential from the cathode of diode 15 and permitting a trigger pulse to switch transistor 13 to its conducting state for another brief period of time. It is this action that allows the combining of several stages into a ring counter circuit as shown by the four stage ring counter of FIGURE 2 where like characters refer to like elements of FIGURE 1.

To achieve this ring counter circuit all terminals denoted as 10 are tied together. All terminals denoted as 17 are tied together; however, only one resistor 19 and one resistor 18 are required. The terminal of each stage denoted as 23 is connected to the terminal of the following stage denoted as 21. Terminal 23 of stage 4 is connected to terminal 21 of stage 1. Terminal 23 of stage 1 is connected to terminal 1 of stage 2, terminal 2 of stage 3, and terminal 3 of stage 4. Terminal 23 of stage 2 is connected to terminal 1 of stage 3, terminal 2 of stage 4, and terminal 3 of stage 1. Terminal 23 of stage 3 is connected to terminal 1 of stage 4, terminal 2 of stage 1, and terminal 3 of stage 2. Terminal 23 of stage 4 is connected to terminal 1 of stage 1, terminal 2 of stage 2, and terminal 3 of stage 3.

A reset circuit is connected to junction 14 of stage 1. This circuit includes a single pole single throw momentary switch 24. The wiper of switch 24 is connected to the positive voltage supply. The normally open contact is connected to current limiting resistor 25. The other end of resistor 25 is connected to the anode of reset diode 28. The cathode of diode 28 is connected to junction 14 of the first stage. It is understood that switch 24 need not of necessity be a mechanical device. A semiconductor reset circuit utilizing either conductivity type of transistor can be used to perform the necessary function. Switch **24*a*, which connects the collector of transistor 13 to ground comprises an alternate reset arrangement. Switch 24*a*** may also be an NPN conductivity type transistor.

The trigger input terminal 20 is connected to a pulse current source 42. In the present example, source 42 provides pulses or wave fronts which are referenced to ground, are positive in nature, and have source impedance characteristics such that the division of the trigger voltage B+, the source impedance, resistor 18, and resistor 19 results in an unloaded pulse amplitude in excess of approximately two volts but not to exceed the voltage on terminal 10 at junction 17. The minimum and maximum widths of the positive trigger are determined by trigger circuit time constants and the response characteristics of the diodes and transistors used.

Application of a positive voltage to the combined terminals denoted as 10 is followed by a momentary closure of switch 24 or **24*a*. Transistor 13 of the first stage switches to its conducting state. The collector of transistor 13 is clamped to approximately .1 volt. Since terminal 1 of stage 2, terminal 2 of stage 3, and terminal 3 of stage 4 are all connected to terminal 23 of stage 1, the result is that transistor 13 of stages 2, 3 and 4 are biased to their non-conducting state as described above in reference to FIGURE 1. Therefore, terminal 23 of stages 2, 3 and 4 will assume a voltage level equal to that at terminal 10. It is impossible for any stage other than stage 1** to be in a conducting state simultaneously.

With terminal 23 of stage 1 essentially at ground potential capacitor 12 of stage 2 discharges and assumes ground potential at junction 27. However, the capacitor 12 at stages 3, 4 and 1 remain charged to the terminal 10 potential and therefore junction 27 of stages 3, 4, and 1 assume terminal 10 potential.

When a trigger pulse is applied to terminal 20 it passes through the trigger diode 15 of stage 2 whose cathode potential has assumed ground potential thereby allowing the trigger pulse to forward bias this diode and charge the coupling capacitor 12. A differentiated current pulse is thus propagated to junction 14 of stage 2 and is developed as a voltage across resistor 11. Diodes 8 and 40 are reversed biased by this voltage and block the current pulse from the low impedance gate circuits.

When the potential at junction 14 (stage 2) reaches the threshold of the base emitter junction of transistor 13, transistor 13 switches to its conducting state. As it does terminal 23 of stage 2 is clamped to .1 volt. Since terminal 1 of stage 3, terminal 2 of stage 4, and terminal 3 of stage 1 are connected to terminal 23 of stage 2 the result is that transistor 13 of stages 3, 4, and 1 are biased to their non-conducting state as described above. Therefore terminal 23 of stages 3, 4, and 1 will assume a voltage level equal to that at terminal 10. Since terminal 23 of stage 3 is connected to terminal 3 of stage 2, terminal 23 of stage 4 is connected to terminal 2 of stage 2, and terminal 23 of stage 1 is connected to terminal 1 of stage 2, the holding bias network of transistor 13 of stage 2 is unclamped and transistor 13 of stage 2 is locked in its conducting state. Now it is impossible for any stage other than stage 2 to be in a conducting state simultaneously. When transistor 13 of stage 1 becomes nonconducting, capacitor 12 of stage 2 charges and terminal 27 of stage 2 assumes B+ voltage to back bias diode 15 of stage 2. When transistor 13 of stage 2 conducts, capacitor 12 of stage 3 discharges to allow diode 15 to pass the next positive pulse from trigger source 42.

The result of applying a trigger pulse has been to move the conducting transistor 13 from stage 1 to stage 2. Trigger pulse 2 moves the conducting transistor 13 from stage 2 to stage 3, pulse 3 moves the conducting transistor 13 from stage 3 to stage 4, and pulse 4 moves the conducting transistor 13 from stage 4 back to stage 1. In this way, the circuit provides the ring counter action.

The circuitry shown in the dashed enclosure A could easily be manufactured in microminiature form by vacuum deposition techniques; for example, using single chip, integrated circuitry, or monolithic technology.

The circuitry shown in the dashed enclosure B is a diode disconnect circuit ideal for ring takeoff. However, other circuits can be used such as the PNP takeoff shown in dashed enclosure C. Takeoff can be directly from terminal 23 of FIGURE 2 as shown in Block D providing the voltage at terminal 23, when transistor 13 is in its nonconducting stage, is maintained at a high enough level to allow reliable transistor switching and steering operation. If collector resistor 22 of transistor 13 is split such as shown in Block E, takeoff can be as shown with the control electrode 44 of amplifier 46 connected to the center 23A of the split collector resistor network 22A and 22B.

The circuits described are of NPN conductivity type transistors; however, PNP conductivity type transistors can be used providing all polarities used in the description above are reversed. The output from the PNP ring counter will be a low impedance B+ level which is sometimes more suitable than a low impedance ground potential. Of course, if B+ and ground of the PNP version are replaced by ground and B− respectively, then the output will be a low impedance ground when on and a higher impedance B− when off. But regardless of polarities or conductive type transistors used, the circuit operation remains basically the same.

Referring now to FIGURE 3 there is illustrated another embodiment of the present invention which comprises a ring counter with forward and reverse counting capabilities depending upon the forward or reverse condition of the steering network. It should be understood that like character references refer to like structure as hereinbefore described. As seen in the figure, the forward steering and triggering networks are dotted and the reverse steering and triggering networks are represented by dashed lines.

Each stage of the circuit shown in FIGURE 3 has two sets of split resistors 48 and 48*a* connected between steering terminals 21 and terminals 27. The value of each resistor 48 is preferably much greater than the value of each collector resistor 22. A clamping diode 46 is connected to the junction of resistors 48 and 48*a* and the diodes in each steering circuit are poled the same and have, in this case, their cathodes connected to a common node. The triggering diodes 15 of each steering network are also similarly poled and have, in this case, their anodes connected to a common node 54 and 56. Diode 52 is connected between nodes 51 and 54 and diode 50 is connected between nodes 53 and 56.

The input trigger source 42 is connected through resistors 18 to nodes 54 and 56. A directional control DPDT switch or a flip-flop, 60, preferably of diode-transistor logic design, has one output 62 connected to node 51 and the other output 64 connected to node 53. The "zero" indication from control flip-flop 60 is at the ground level and the "one" indication is at the B+ level. The forward steering and triggering network is in circuit when a "one" appears on lead 62 and a "0" appears on lead 64, and the reverse triggering and steering network is in circuit when a "zero" appears on lead 62 and a "one" appears on lead 64.

A reset switch 24 is connected between B+ and the base of transistor 13 via a series resistor-diode circuit, resistor 25 and diode 28. Switch 24*a* which connects the collector of transistor 13 to ground comprises an alternate reset arrangement. The reset arrangement including switch 24*a* is preferred when the circuit is fabricated as a microminiature circuit or monolithic chip in order to utilize efficiently existing chip output leads.

In operation, upon actuation of either reset switch 24 or 24*a*, transistor 13 of stage 1 becomes conductive and the capacitor 12 of the forward steering circuit of stage 2 discharges in the manner set forth above. Control flip-flop 60, when in its forward direction, supplies a B+ voltage to terminal 51 and a ground potential to terminal 53. Source 42 supplies a positive trigger pulse through resistors 18 to terminals 56 and 54, respectively. The pulse at terminal 56 passes through diode 50 due to the ground potential at terminal 53. Resistor 18 thus prevents the out of circuit steering network from providing a direct short across the trigger pulse source 42. The input trigger pulse supplied to node 54 passes through diode 15 of the forward trigger circuit of stage 2 in the manner described above and turns transistor 13 of stage 2 to its "on" condition. The same trigger pulse does not pass through diodes 15 of the forward trigger circuit of the first and third stages for the reasons set forth above. When the second stage turns "on," ground potential is fed to one of the gating diodes of stages 1 and 3 turning stage 1 off while maintaining stage 3 in the off state. As stage 1 is turning off, the collector voltage rises sharply to B+ level. In the reverse steering circuit of stage 3, clamping diode 46 prevents this sharp rise from entering capacitor 12 of the same circuit by clamping the junction of resistors 48 and 48*a* of this circuit to the ground potential which appears at lead 64. To assure the collector voltage of transistor 13 of stage 1 assumes approximately a B+ potential, resistor 48 should be much larger than the value of each collector resistor 22. This potential is important when takeoff circuitry requires that off levels assume near B+ voltage as well as for proper circuit operation.

When stage 2 is on, capacitor 12 of the forward steering circuit of stage 3 is discharged, capacitor 12 of the forward steering circuit of stage 2 becomes charged to approximately B+ and the ring counter is then ready to receive the next trigger pulse. Thus, the cycle will continue in the forward direction with each trigger pulse supplied by source 42 in the manner described above.

When reverse counting direction is desired, control flip-flop 60 is reversed so that ground potential appears on lead 62 and B+ appears on lead 64. With these voltages suplied to nodes 51 and 53, the reverse triggering network is in circuit, the forward steering and triggering network is out of circuit and operation is the same as described above. Thus, with stage 1 of the counter on and the other stages off, the first trigger pulse from source 42 turns stage 3 on which in turn turns stage 1 off and maintains stage 2 off. Thus, the sequence of operation is 3–2–1, 3–2–1, etc.

It should be understood that the embodiment shown in FIGURE 3 is by way of example only and that there could be any reasonable number of stages in the counter as dictated by transistor parameters and complexity and that the polarities of all components and voltages can be reversed without departing from the spirit and the scope of the present invention. Also, it is again pointed out that the control flip-flop and the bi-directional counter lend themselves well to be constructed in monolithic fashion on a single chip.

Other and further modifications can be made to the presently disclosed examples without departing from the spirit and scope of the present invention.

I claim:

1. A ring counter and the like comprising a plurality of stages, each stage comprising a conductive semiconductor element having a control electrode and first and second electrodes, a voltage source of one polarity coupled to said first electrode and a common potential source connected to said second electrode so that said voltage source value appears at said first electrode when said element is nonconducting and approximately said common potential value appears at said first electrode when said element is conducting, a stage output terminal connected to said first electrode, a gating circuit with at least a number of gating input terminals which is one less than the number of stages in the ring counter, said gating input terminals coupled to said control electrode for rendering said element nonconductive when a signal of about common potential value appears at any of said gating input terminals, a forward steering and triggering network comprising a trigger pulse passing means for each stage having two terminals for passing trigger pulses of a predetermined polarity and for blocking trigger pulses when said passing means is biased at a blocking level, a trigger terminal for each stage coupled to one of said two terminals, biasing means for each stage coupled between the other of said two terminals and said control electrode for biasing said passing means at the blocking level and for conveying to said control electrode at least a portion of the trigger pulse passing through said passing means when it is not biasing the passing means at the blocking level, a steering input terminal for each stage coupled to the other of said two terminals for controlling the biasing level of said biasing means by feeding predetermined voltage levels thereto, a node electrically located between each successive stage and electrically connected to the immediately preceding stage output terminal, the immediately subsequent steering input terminal, as well as one of the input gating terminals of each stage except the immediate preceding stage, each of said one of said two terminals of all stages being electrically connected together and coupled to an input trigger terminal for all stages, a source of trigger pulses coupled to said input trigger terminal, the counter further comprising reset means connected to one of said stages for causing the element thereof to conduct at the beginning of operation, whereby each trigger pulse is simultaneously fed to all stages but only the stage subsequent to the conducting stage changes states due to the lack of blocking bias on said biasing means whereby the approximate common potential on the second electrode of the stage switched to its conductive state is fed to one of said gating input terminals of the immediately preceding stage to turn the same off, and this ring counter further comprising a reverse steering and triggering network comprising another trigger pulse passing means, for each stage having two additional terminals for passing trigger pulses of a predetermined polarity and for blocking trigger pulses when said other passing means is biased at a blocking level; another trigger terminal for each stage coupled to one of said two additional terminals; another biasing means for each stage coupled between the other of said additional two terminals and said control electrode for biasing said another passing means at the blocking level and for conveying to said control electrode at least a portion of the trigger pulse passing through said other passing means when it is not biasing said other passing meeans at the blocking level; another steering input terminal for each stage coupled to the other of said two additional terminals for controlling the biasing level of said other biasing means by feeding predetermined voltage levels thereto; another node electrically located between each successive stage and electrically connected to the immediately subsequent stage output terminal, the immediately preceding other steering input terminal, as well as one of the input gating terminals of each stage except the immediately subsequent stage; each of said one of said two additional terminals of all stages being electrically connected together and coupled to another input trigger terminal for all stages; said source of trigger pulses coupled to said other input trigger terminal; and a selectively reversible, two state device for enabling one of said forward and reverse triggering and steering networks and disabling the other of said forward and reverse triggering and steering networks.

2. A ring counter and the like as set forth in claim 1, wherein each said biasing means comprises a capacitor connected between the other of said two terminals and said control electrode, and additional means being provided between said control electrode and the source of common potential for providing a charging and discharge path for said capacitor.

3. A ring counter and the like as set forth in claim 2, wherein each said passing means comprises a diode which is poled so that it is biased off when said capacitor is charged.

4. A ring counter and the like as set forth in claim 3, wherein each said gating circuit comprises a diode connected to each of said number of gating input terminals and each having a corresponding electrode connected to a common node, another diode connected between said common node and said control electrode and also poled so that its corresponding electrode is connected to said common node.

5. A ring counter and the like as set forth in claim 1, further including means connected between said device and said forward and reverse networks for providing a bypass circuit between the trigger pulse source and said device for the trigger pulse fed to the disabled one of said networks.

6. A ring counter and the like as set forth in claim 1, further comprising diode means coupled between said device for the trigger pulse fed to the disabled one of said the rising voltage magnitude at a turning off stage output terminal from being fed into the adjacent steering terminal of the disabled one of said forward and reversing triggering and steering networks.

7. A ring counter and the like as set forth in claim 1, wherein said device comprises a directional control flipflop and wherein said reset means comprises switch means for selectively grounding said first electrode of said one of said stages.

References Cited

UNITED STATES PATENTS

| | | | |
|---|---|---|---|
| 3,192,406 | 6/1965 | Somlyody | 307—224 XR |
| 3,253,158 | 5/1966 | Horgan | 307—223 XR |

ARTHUR GAUSS, *Primary Examiner.*

JOHN ZAZWORSKY, *Assistant Examiner.*

U.S. Cl. X. R.

307—223; 328—43, 44